United States Patent [19]

Kerr

[11] 4,188,612
[45] Feb. 12, 1980

[54] PIEZOELECTRIC SEISMOMETER

[75] Inventor: James D. Kerr, Allen, Tex.

[73] Assignee: Teledyne Industries Inc. (Geotech Division), Dallas, Tex.

[21] Appl. No.: 901,680

[22] Filed: May 1, 1978

[51] Int. Cl.² ............................................. G01V 1/16
[52] U.S. Cl. .................................... 367/160; 310/329
[58] Field of Search ............... 340/17 R, 10; 310/329, 310/328, 330, 331, 332, 324; 73/517 R

[56] References Cited

U.S. PATENT DOCUMENTS

| | | | |
|---|---|---|---|
| 2,411,401 | 11/1946 | Welch | 73/517 R X |
| 2,873,604 | 2/1959 | Samsel | 310/329 X |
| 3,187,300 | 6/1965 | Brate | 310/331 X |
| 3,638,052 | 1/1972 | Massa | 310/324 |
| 3,688,251 | 8/1972 | Morris | 340/17 R |
| 3,707,131 | 12/1972 | Massa | 310/324 |
| 3,849,679 | 11/1974 | Massa | 310/324 |
| 3,911,388 | 10/1975 | Crump et al. | 340/17 R |

Primary Examiner—Theodore M. Blum
Attorney, Agent, or Firm—Dowell & Dowell

[57] ABSTRACT

A short period seismometer sealed in a housing with an oil-immersed frame supporting a mass suspended for displacement along an axis of sensitivity of the instrument, one end of the mass being merely guided and constrained for axial movement, and the other end of the mass being supported by a spring disc assembly clamped in the frame at its periphery and attached to the mass at its center, the disc assembly including a piezoelectric disc bonded to a spring metal disc on the opposite face thereof from the mass and the piezoelectric disc having a diameter about 0.68 times the diameter of the spring metal disc to achieve optimum output signal, the mass restoring force being concentrated in the spring disc assembly, and the constraining guide at the other end of the mass contributing only insignificantly to the restoring force.

6 Claims, 4 Drawing Figures

PIEZOELECTRIC SEISMOMETER

FIELD OF INVENTION

This invention relates to short period seismometer, and more particularly to improvements in the suspension of the mass in the frame whereby a piezoelectric transducer can be stressed in an improved manner to achieve improved signal output characteristics.

BACKGROUND AND PRIOR ART

Short period seismometers with a natural period of about 1 Hz have conventionally been made by mounting a mass on a spring system with suitable damping, and by employing a moving coil and magnet arrangement which delivers output proportional to the rate of displacement of the mass with respect to the mounting frame. This type of seismometer enjoys a high degree of perfection, but suffers from the disadvantage that it is expensive to manufacture. Accordingly, there has been considerable effort in recent years to provide a satisfactory short period seismometer which will be less expensive to manufacture. One approach to this problem has been to use a ceramic transducer disc attached to the spring disc diaphragms which support the mass with respect to the frame. Electrodes applied to the ceramic disc deliver a potential which is proportional to the stress in a ceramic, and therefore, proportional to flexure strain of the diaphragm on which it is mounted.

The prior art includes a number of patents showing this type of suspension. For example, U.S. Pat. No. 3,893,342 to Florian et al shows the mounting of a displaceable accelerometer mass on a pair of crossed beams to which ceramic piezoelectric strips have been bonded. U.S. Pat. No. 3,911,388 to Crump et al, shows an accelerometer comprising a mass in the form of a sphere which is confined within the supporting frame between two metallic discs to which the sphere is tangent, the discs having ceramic material bonded to their outer surfaces. U.S. Pat. No. 3,732,446 to Bryant, shows a mass which is mounted for vibration in a liquid filled chamber, and wherein the liquid transfers vibrations from the mass to a disc 13 which supports a piezoelectric transducer bonded thereto, although the disc is not directly connected with the mass.

The self capacitance of a piezoelectric transducer of the type under present consideration is a problem in that the capacitance goes up as the diameter of the piezoelectric disc is increased. A high impedance electronic amplifier is therefore required to achieve maximum coupling to the piezoelectric disc while providing a low impedance output to drive the cables by which the seismometer is connected to remote recording equipment. Amplifiers of this type are shown in U.S. Pat. No. 3,749,946 to Ruti, and in U.S. Pat. No. Re. 28,596 to Siegel.

THE INVENTION

In order to transfer maximum stress to the piezoelectric transducer disc element, while at the same time minimizing its self capacitance, the present invention teaches a structure to optimize the stress in the ceramic by concentrating substantially the entire spring restoring force for the mass in only one spring disc located at one end thereof, rather than distributing the restoring force between two springs at opposite ends of the mass. The supporting disc at the lower end of the mass is made very thin and larger in diameter so that it contributes insignificantly to the mass restoring force, but does serve to act as a mass centering element. Furthermore, the present invention concentrates the restoring force, not merely in the metallic disc, but in the composite comprising the metallic disc and the piezoelectric ceramic material laminated thereto, so that the piezoelectric material contributes to the over-all mass restoring force. By concentrating substantially the entire restoring force in the upper spring disc, to achieve the same stiffness the disc is thereby made smaller in diameter and thicker not only as compared with the lower disc, but also as compared with what its diameter and thickness would be if the restoring force were equally distributed between an upper spring disc and a similar lower disc. Since the spring disc is accordingly made smaller in diameter, greater stress is concentrated in the ceramic disc which is bonded to it. Moreover, since the spring disc is also made thicker, the bonded ceramic is therefore displaced further off the center plane of the metallic disc, whereby the ceramic disc is subjected to greater stress. As a result of the fact that the stress in the ceramic disc is made greater, its output voltage is proportionately increased, and since the whole disc assembly is made somewhat smaller in diameter, the self capacitance of the ceramic transducer is accordingly reduced.

The metallic spring disc to which the ceramic is bonded is clamped all the way around its edges to the frame of the seismometer. There is an optimum ratio between the diameter of the ceramic disc and the diameter of the spring disc. This ratio was calculated to be about 0.6, but it was discovered unexpectedly that the diameter of the ceramic should be made greater than this originally calculated 0.6 ratio and that a ratio of about 0.68 would be optimum. Apparently, this unexpected variation is attributable to the clamping of the edges of the metallic disc, thereby changing its flexure configuration somewhat. If the ceramic disc is made smaller than this optimum diameter, loss of output voltage results which is undesirable. Conversely, if the diameter of the ceramic disc exceeds the optimum ratio, the output voltage from the transducer will be decreased because of the fact that the portion of the ceramic which lies outside of the optimum diameter begins flexing in the opposite direction, thereby producing a subtractive voltage which is deducted from the output voltage generated by portions of the ceramic lying inside of the optimum diameter.

It is a principal object of this invention to provide an improved short period seismometer which can be manufactured at relatively low cost using piezoelectric transducer means.

It is another major object of the invention to provide a piezoelectric transducer having an improved output signal level for a given sensed displacement of the seismometer frame.

It is still another object of the invention to provide an improved piezoelectric seismometer providing such improved output without increasing the self capacity of the transducer element.

Another object of the invention is to provide an improved seismometer of the type above specified which is sealed in a suitable housing containing the seismometer, an amplifier circuit board, oil damping means, and a calibration coil and magnet arrangement.

PREFERRED EMBODIMENT

Figure 1:
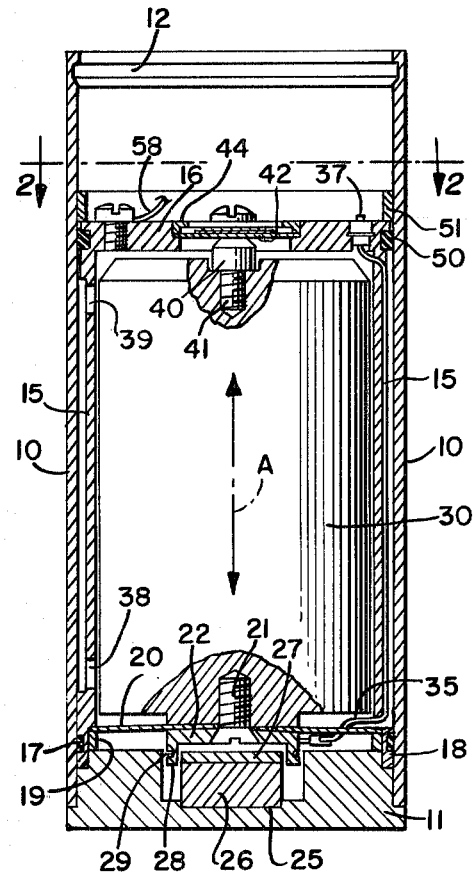
FIG. 1 is a longitudinal sectional view of a seismometer with the connector and the electronic circuit board removed.
Figure 3:
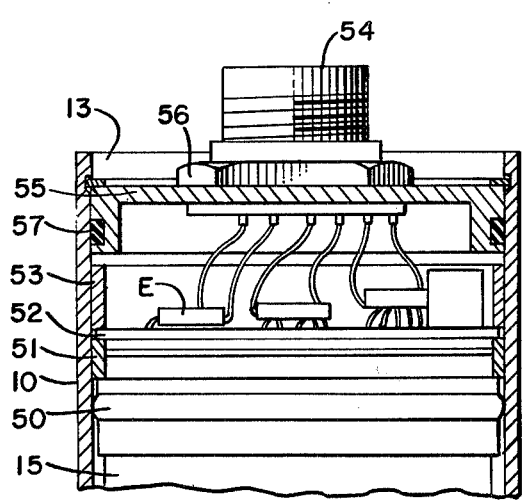
FIG. 3 is a partial longitudinal sectional view showing the upper portion of the seismometer somewhat enlarged and showing the electronic circuit board therewithin.

Referring now to the drawings, FIG. 1 shows a longitudinal view through a housing including a sleeve 10 and a bottom closure member 11. The upper end of the sleeve 10 has a groove 12 around it which receives a locking ring 13 as can be seen in FIG. 3.

Within the sleeve 10 is a frame including a tubular portion 15 which extends the full length of the suspension assembly of the seismometer and is closed at its upper end by a transverse plate 16 integrally joining the tubular walls 15 of the frame. The lower end of the frame 15 has an enlarged outside diameter as at 17 which rests against the side of the housing. The inner periphery of the frame is undercut as at 18 to receive a ring 19. The ring 19 holds a thin disc diaphragm against the shoulder provided by the annular enlargement 18, and this thin disc 20 is attached to the lower end of a displaceable mass 30 which is located in the tubular frame portion 15 and spaced from its inner periphery. A screw 21 extends through a lower washer 22 and presses the washer against the thin disc 20 so as to attach it to the lower end of the mass 30. The lower closure member 11 has a socket 25 which receives and supports a magnet 26 having an iron pole piece 27 at its upper end. The washer 22 has a downwardly extending annular flange 28 which supports a coil 29 in a groove, the coil cooperating with the magnet 26 in a manner to be hereinafter explained. Wires 35 connect the coil 29 with the terminals 37 on the upper plate 16 of the housing as will be hereinafter discussed in further detail.

The lower portion of the housing, and the frame are filled with oil, and the sidewalls of the frame are provided with holes 38 and 39 permitting circulation of the oil above and below the mass 30 for the purpose of damping motion of the mass in a manner well known per se. The upper end of the mass 30 is connected with a stud 40 which has a screw end 41 which screws into the upper end of the mass 30 to support it. The top of the stud 40 is secured to the underside of a metallic spring disc 42 by suitable means, such as soldering or welding. Alternatively, the stud 40 and disc 42 can be made as one piece. The disc rests against the horizontal shoulder of a groove 43 cut in the upper surface of the frame plate 16. A ring 44 is pressed into the groove 43 to clamp the peripheral edge of the spring disc 42 against the shoulder of the groove 43 and hold it tightly in place.

A ceramic transducer disc 45 is conductively bonded to the metallic spring disc 42 using conductive cement and a very thin metal electrode 46 is bonded to the other side of the ceramic disc, all in a manner well known per se. An electrical terminal 47 is conductively connected to the electrode 46. These features are also visible in FIGS. 2 and 4.

Figure 2:
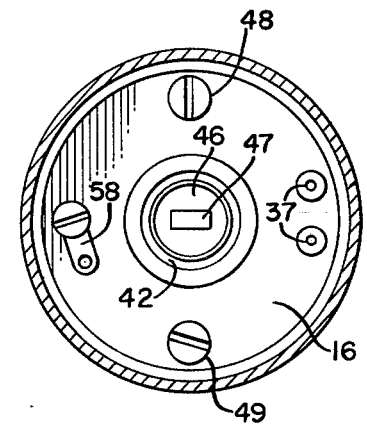
FIG. 2 is a view of the transducer taken along line 2—2 of FIG. 1.

FIG. 2 further shows a pair of screws 48 and 49 through which oil can be inserted into the housing 10 and the frame 15, while at the same time evacuating air therefrom so that the assembly is filled with oil virtually free of bubbles. O-rings 17 and 50 prevent escape of the oil, and a snap ring 51 holds the frame down in the housing so that the lower end of the tubular wall of the frame abuts against the bottom closure member 11. The sleeve 10 is suitably sealed to the closure member 11, for instance by soldering.

As can be seen best in FIG. 3, a circuit board 52 lies on the press fit ring 51 and held down thereagainst by another ring 53 which is a snug fit in the housing sleeve 10. The circuit board 52 carries electronic amplifier components E, and is wired to the lower end of an electrical connector 54 which is supported on a downwardly flanged plate 55, the socket being held thereon by a nut 56 in a manner well known per se. An O-ring 57 is also provided in the downwardly flanged portion of the plate 55 to seal against entry of moisture from outside the seismometer housing into the vicinity of the electronic circuitry E.

Figure 4:
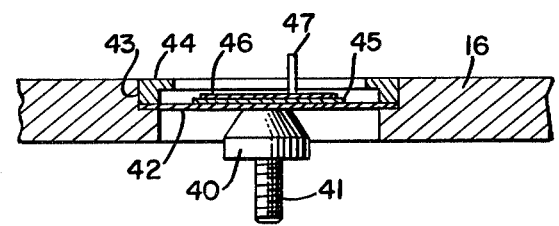
FIG. 4 is an enlarged partial cross-sectional view through the mounting for the spring disc assembly which includes the transducer and supports the upper end of the mass.

Referring now to FIG. 1 and to FIG. 4, it should be particularly noted that the spring disc assembly comprising the parts 42, 45 and 46 is of considerably lesser diameter than the lower centering disc 20. The disc 20 provides only slight restoring force to the mass, and performs the principal function of centering the lower end of the mass so that it is only free to move along the axis of sensitivity A of the seismometer. Thus, most of the restoring spring action is provided by the spring disc assembly including the smaller diameter and thicker metal disc 42 with the ceramic disc 45 bonded thereto. The output from the ceramic transducer is taken from the terminal 47 and also from a lug 58 which is screwed to the upper plate of the metallic frame 16 and thereby grounded to the outer periphery of the spring metal disc 42. This output is delivered to the electronic amplifier E which has a very high impedance input and a low impedance output to the connector 54, FIG. 3. The smallness of the diameter of the spring disc 42 as compared with the centering disc 20 assures that most of the spring action will be supplied by the disc 42 which will thereby be highly stressed, and will accordingly highly stress the ceramic disc 45 bonded thereto, the diameter of the ceramic 45 being about 0.68 times the diameter of the metallic spring disc 42 for reasons which have previously been explained in the early part of the specification.

The coil 29, magnet 26 and pole piece 27 shown at the bottom of FIG. 1 are used for the purpose of calibrating the seismometer by applying a known force to the mass 30. A mass displacing force is produced by passing an electric current of known magnitude through the coil 29 via the terminals 37 and the wires 35, thereby to establish a magnetic pull on the coil 29 and coil form 28 with respect to the magnet 26 and the pole pieces 27. The terminals 37 are connected by other wires (not shown) with two of the terminals in the plug 54 on top of the plate 55. This type of calibration system is well known per se in the prior art.

The present invention is not to be limited to the exact form shown in the drawings, for obviously changes can be made therein within the scope of the following claims:

I claim:

1. A seismometer for delivering signals representing vibrational displacements along an axis of sensitivity, comprising:

a frame extending about said axis;

a rigid vibratory mass in the frame disposed along said axis and having first and second axially spaced ends;

means for restoring the position of the mass in the frame consisting essentially of one spring disc assembly having a disc of spring metal disposed opposite said first end of the mass and fixed at its center thereto to support said first end and yieldably to oppose displacements of the mass in both directions along said axis, and said restoring means further including a piezoelectric disc having one face conductively bonded to a face of the metal disc, and having an electrode bonded to the other face of the piezoelectric disc and operative to deliver said signals, the composite of the metal disc and piezoelectric disc providing the stiffness of the spring disc assembly;

mounting means supported on the frame and tightly clamping the edge of the metal disc all the way around its periphery to hold said edge in a plane normal to the axis, whereby when the mass displaces the central portion of the metal disc from said plane the central portion will flex in one direction and an annular portion of the metal disc nearer its periphery will flex in the opposite direction, the piezoelectric disc overlying said central portion of the metal disc and the ratio of the diameter of the piezoelectric disc to the diameter of the metal disc being about 0.68; and constraining means coupled to the second end of the mass and attached to the frame and operative to constrain the mass to displacements in the direction of the axis.

2. The seismometer as claimed in claim 1, wherein the frame comprises a tubular wall metal member closed at its upper end, and said end of the frame having an opening having an annular shoulder therearound shaped to receive the periphery of the spring metal disc, and said mounting means comprising a ring fitted into the opening and clamping said periphery against the shoulder.

3. The seismometer as claimed in claim 2, wherein said constraining means comprises a yieldable disc supported at its outer edges by the frame and attached at its center to the lower end of the mass, the yieldable disc being larger in diameter than said spring metal disc and having a resistance to flexure which is small as compared with that of said spring disc assembly.

4. The seismometer as claimed in claim 3, wherein a coil and supporting form are connected to the center of the yieldable disc opposite said mass with the coil being disposed about said axis, a magnet fixed with respect to said frame and operatively disposed with respect to the coil, and means connecting the coil with connector terminals through which the coil can be pulsed to displace the mass relative to the frame.

5. The seismometer as claimed in claim 2, wherein said frame is enclosed in a housing and immersed in a damping fluid which fills the space between the frame and the mass, the cylindrical wall being provided with holes extending from the vicinity of the ends of the mass to the housing, whereby axial vibration of the mass displaces the fluid from one hole toward the other along a path extending between the frame and the housing.

6. The seismometer as claimed in claim 1, wherein a metal stud is secured to the center of the spring metal disc on the side thereof opposite from the piezoelectric disc, the stud having a threaded portion screwed into a tapped hole in the first end of the mass, the diameter of the stud being small as compared with the diameter of the piezoelectric disc and the spring metal disc.

* * * * *